(12) United States Patent
Salman et al.

(10) Patent No.: US 8,260,486 B2
(45) Date of Patent: Sep. 4, 2012

(54) METHOD AND APPARATUS FOR DIAGNOSIS OF SENSORS FAULTS USING ADAPTIVE FUZZY LOGIC

(75) Inventors: Mutasim A. Salman, Rochester Hills, MI (US); Pierre-Francois D. Quet, Madison Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1252 days.

(21) Appl. No.: 12/024,143

(22) Filed: Feb. 1, 2008

(65) Prior Publication Data
US 2009/0198408 A1    Aug. 6, 2009

(51) Int. Cl.
*G06F 7/00* (2006.01)
(52) U.S. Cl. ............ 701/30.2; 701/29.1; 701/29.2; 701/29.7; 701/30.3; 701/32.9; 706/1; 706/4; 706/8; 706/52; 706/900
(58) Field of Classification Search ............ 701/29, 701/31, 33, 39, 44, 77; 706/1, 2, 4, 8, 52, 706/900
See application file for complete search history.

(56) References Cited

U.S. PATENT DOCUMENTS

| | | | |
|---|---|---|---|
| 5,414,645 A * | 5/1995 | Hirano | 702/185 |
| 5,707,117 A | 1/1998 | Hu et al. | |
| 6,202,009 B1 | 3/2001 | Tseng | |
| 6,625,527 B1 | 9/2003 | Ding et al. | |
| 6,766,230 B1 | 7/2004 | Rizzoni et al. | |
| 6,898,585 B2 * | 5/2005 | Benson et al. | 706/52 |
| 7,133,755 B2 | 11/2006 | Salman et al. | |
| 7,136,729 B2 | 11/2006 | Salman et al. | |
| 7,322,439 B2 * | 1/2008 | Hara et al. | 180/402 |
| 7,734,400 B2 * | 6/2010 | Gayme et al. | 701/54 |
| 7,941,701 B2 * | 5/2011 | Wegerich et al. | 714/26 |
| 2005/0021212 A1 | 1/2005 | Gayme et al. | |
| 2006/0287806 A1 | 12/2006 | Hori | |

FOREIGN PATENT DOCUMENTS

JP    05-141999 A    6/1993

OTHER PUBLICATIONS

D. Fischer, M. Börner, J. Schmitt, R. Isermann, Fault detection for lateral and vertical vehicle dynamics, Control Engineering Practice, vol. 15, Issue 3, Mar. 2007, pp. 315-324.*
Börner, Marcus and Isermann, Rolf, "Supervision, fault detection, and sensor fault tolerance of passenger cars," Proc. of Safeprocess 2003, pp. 327-334, 2003.

* cited by examiner

*Primary Examiner* — Thomas Black
*Assistant Examiner* — Peter D Nolan
(74) *Attorney, Agent, or Firm* — John A. Miller; Miller IP Group, PLC (57) ABSTRACT

A method for monitoring the sensors in a vehicle control system. The method includes identifying a plurality of potential faults, identifying a plurality of measured values, and identifying a plurality of estimated values based on models in the control system. The method further includes identifying a plurality of residual error values as the difference between the estimated values and the measured values. The method also defines a plurality of fuzzy logic membership functions for each residual error value. The fuzzy logic membership functions are adaptive in that they change depending on the vehicle operating region, i.e., the non-linearity level of the vehicle, and the vehicle operating conditions, i.e., steady state verses transients. A degree of membership value is determined for each residual error value based on the membership functions. The degree of membership values are then analyzed in a fuzzy logic reasoning system to determine whether a potential fault exists.

25 Claims, 6 Drawing Sheets

METHOD AND APPARATUS FOR DIAGNOSIS OF SENSORS FAULTS USING ADAPTIVE FUZZY LOGIC

BACKGROUND OF THE INVENTION

1. Field of the Invention

This invention relates generally to a system and method for monitoring the state of health and providing fault diagnosis for components in an integrated vehicle stability system, by-wire vehicle, vehicle active control system, etc. and, more particularly, to an adaptive fuzzy logic based state of health and fault diagnosis monitoring system for a vehicle employing an integrated stability control system, by-wire vehicle, vehicle active control system, etc.

2. Discussion of the Related Art

Diagnostics monitoring for vehicle stability systems is an important vehicle design consideration so as to be able to quickly detect system faults, and isolate the faults for maintenance, control reconfiguration, tolerance and fail safe purposes. These stability systems typically employ various sensors, including yaw rate sensors, lateral acceleration sensors, wheel speed sensors and steering hand-wheel angle sensors, that are used to help provide the stability control of the vehicle. For example, certain vehicle stability systems employ automatic braking in response to an undesired turning or yaw of the vehicle. Other vehicle stability systems employ active front-wheel or rear-wheel steering that assist the vehicle operator in steering the vehicle in response to the detected rotation of the steering wheel. Other vehicle stability systems employ active suspension stability systems that change the vehicle suspension in response to road conditions and other vehicle operating conditions.

If any of the sensors, actuators and sub-systems associated with these stability systems fail, it is desirable to quickly detect the fault and activate fail-safe strategies so as to prevent the system from improperly responding to a perceived, but false condition. It is also desirable to isolate the defective sensor, actuator or sub-system for maintenance and replacement purposes, and also select the proper fail-safe action for the problem. Thus, it is necessary to monitor the various sensors, actuators and sub-systems employed in these stability systems to identify a failure.

SUMMARY OF THE INVENTION

In accordance with the teachings of the present invention, a system and method for monitoring the state of health of sensors, actuators and sub-systems in an integrated vehicle control system is disclosed. The method includes identifying a plurality of potential faults, such as faults relating to lateral acceleration sensors, yaw rate sensors, road wheel angle sensors and wheel speed sensors. The method further includes identifying a plurality of measured values, such as from the yaw rate sensor, the lateral acceleration sensors, the road wheel angle sensors and the wheel speed sensors. The method further includes identifying a plurality of estimated values based on models, such as estimated or anticipated output values for the yaw rate, lateral acceleration, road wheel angle and wheel speeds. The method further includes identifying a plurality of residual error values as the difference between the estimated values and the measured values. The method also defines a plurality of adaptive fuzzy logic membership functions for each residual error value. The fuzzy logic membership functions are adaptive in that they change depending on the vehicle operating region, i.e., the non-linearity level of the vehicle, determined by the lateral acceleration of the vehicle, and the vehicle operating conditions, i.e., steady-state versus transients, determined by a yaw acceleration of the vehicle. A degree of membership value is determined for each residual error value based on the membership functions. The degree of membership values are then analyzed to determine whether a potential fault exists.

Additional features of the present invention will become apparent from the following description and appended claims taken in conjunction with the accompanying drawings.

DETAILED DESCRIPTION OF THE EMBODIMENTS

The following discussion of the embodiments of the invention directed to a system and method for monitoring the state of health of sensors, actuators and sub-systems in an integrated vehicle stability control system using adaptive fuzzy logic analysis is merely exemplary in nature, and is in no way intended to limit the invention or its applications or uses.

The present invention includes an algorithm employing adaptive fuzzy logic for monitoring the state of health of sensors, actuators and sub-systems that are used in an integrated vehicle stability control system. The vehicle stability integrated control system may employ a yaw rate sensor, a vehicle lateral acceleration sensor, vehicle wheel speed sensors and road wheel angle sensors at the vehicle level. The integrated control system may further include active brake control sub-systems, active front and rear steering sub-systems and semi-active suspension sub-systems. Each component and sub-system used in the integrated vehicle stability control system employs its own diagnostic sensors and monitoring, where the diagnostic signals are sent to a supervisory monitoring system. The supervisory system collects all of the information from the sub-systems and the components, and uses a reasoning system to detect, isolate and determine the faults in the stability control system.

Figure 1:
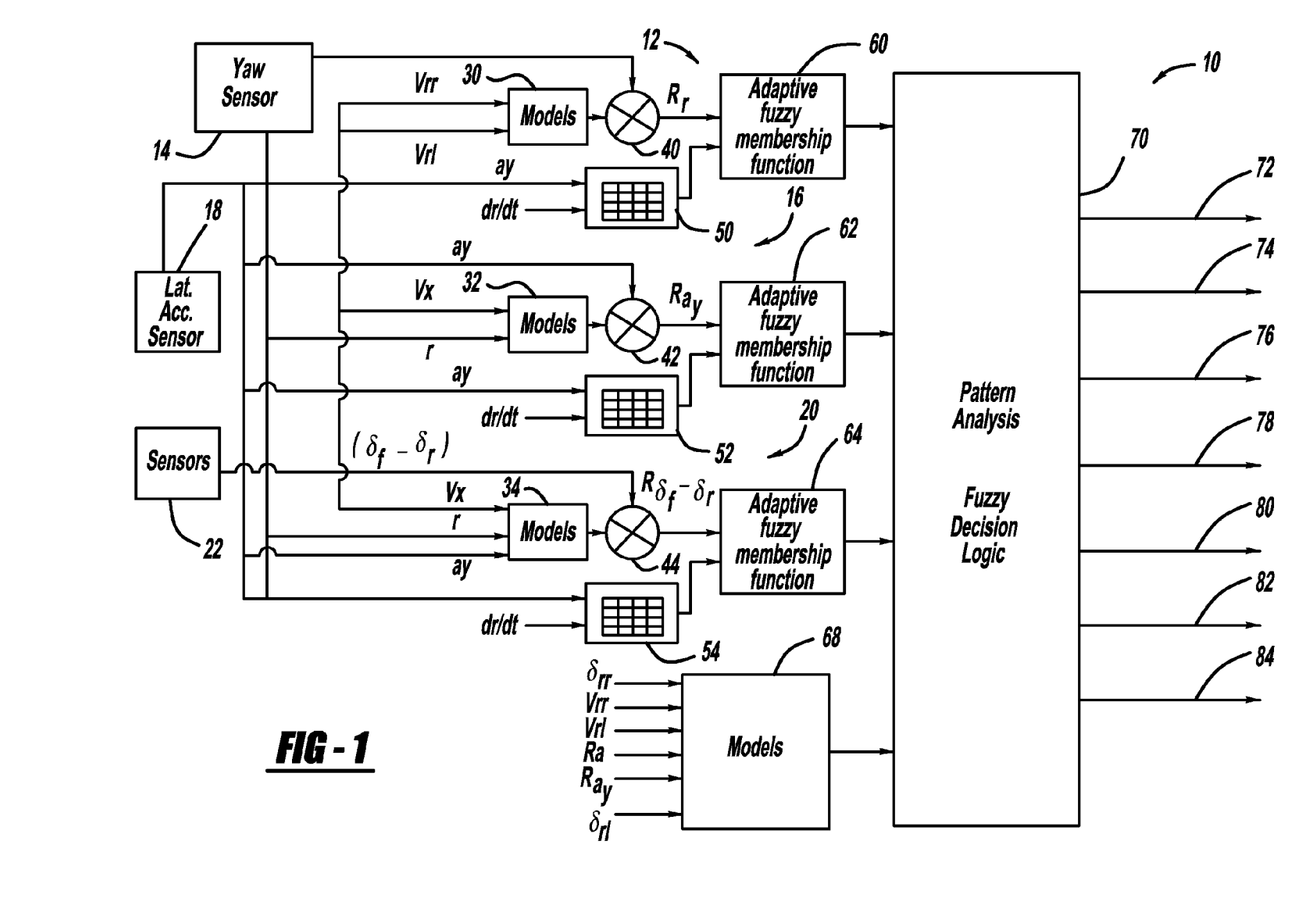
FIG. 1 is a block diagram of an adaptive fuzzy logic system for monitoring the state of health of sensors, actuators and sub-systems used in an integrated vehicle stability control system, according to an embodiment of the present invention.

FIG. 1 is a block diagram of a state of health monitoring and fault diagnostic system 10 for detecting sensor and sub-system faults, according to an embodiment of the present invention. The system 10 includes a sub-system 12 for determining whether a yaw rate sensor 14 has failed, a sub-system 16 for determining whether a lateral acceleration sensor 18 has failed and a sub-system 20 for determining whether road wheel angle and wheel speed sensors have failed. Box 22 is intended to represent various sensors, including a vehicle speed sensor or vehicle speed estimator, wheel speed sensors and road wheel angle sensors. The yaw rate sensor 14 provides a measured yaw rate signal r of the yaw rate of the vehicle, the lateral acceleration sensor 18 provides a measured lateral acceleration signal $a_y$ of the lateral acceleration of the vehicle and the sensors 22 provide various wheel speed signals, road wheel angle signals and a vehicle longitudinal speed signal $V_x$, where $v_{RR}$ is the rear-right wheel speed $v_{FR}$ is the front-right wheel speed, $v_{FL}$ is the front-left wheel speed, $v_{RL}$ is the rear-left wheel speed, $\delta_f$ is the front road wheel angle, $\delta r$ is the average rear road wheel angle computed from the rear-right road wheel angle $\delta_{rr}$ and the rear-left road wheel angle $\delta_{rl}$.

The sub-systems 12, 16 and 20 include model processors 30, 32 and 34, respectively, that provide models for the outputs of the particular sensor. The model processor 30 receives the wheel speed signals $v_{RR}$ and $v_{RL}$ of the rear-right wheel and the rear-left wheel. The model processor 32 receives the vehicle speed signal $V_x$ and the yaw rate signal r. The model processor 34 receives the yaw rate signal r, the lateral acceleration signal $a_y$ and the vehicle speed signal $V_x$.

The processor 30 provides one or more estimates of the vehicle yaw rate based on suitable model equations, the processor 32 provides one or more estimates of the lateral acceleration of the vehicle based on suitable model equations and the processor 34 provides one or more road wheel angle (RWA) estimates based on suitable model equations. Suitable model examples are given below.

The sub-system 12 includes a residual generator 40, the sub-system 16 includes a residual generator 42 and the sub-system 20 includes a residual generator 44. The residual generator 40 receives the yaw rate signal r from the sensor 14 and the yaw rate model estimates from the processor 30, and generates a residual $R_r$ as the difference between the measured yaw rate from the sensor 14 and the estimated yaw rate from the models. The residual generator 42 receives the measured lateral acceleration signal $a_y$ from the lateral acceleration sensor 18 and the lateral acceleration model estimates from the processor 32, and generates a residual $R_{a_y}$ as the difference between the measured lateral acceleration and the estimated lateral acceleration from the models. The residual generator 44 receives the road wheel angle signals from the sensors 22 and the road wheel angle estimates from the model processor 34, and generates a residual $R_{\delta_f-\delta_r}$ as a difference between the measured road wheel angles and the estimated road wheel angles.

The error or residual between the model estimate values and the actual measurement values can be the result of several factors. These factors include modeling errors due to parameter variations, i.e., the understeer coefficient, vehicle model non-linearities, transient effects, sensor biases and measurement noise, outside disturbances, such as bank angle effect and faults.

The sub-systems 12, 16 and 20 include an adaptive threshold generator 50, 52 and 54, respectively, that receive the lateral acceleration signal $a_y$ and a yaw acceleration signal $y_{acc}$ as the derivative of the yaw rate signal r (dr/dt). The threshold generators 50, 52 and 54 generate an adaptive threshold that is used to define membership functions. The adaptive threshold changes in response to the changes in lateral acceleration and the yaw acceleration so as to increase the reliability of the fault detection, and reduce false alarms. Particularly, as the lateral acceleration and the yaw acceleration increase, the threshold also increases. The lateral acceleration $a_y$ of the vehicle is an indication of the operating region (non-linearity level) of the vehicle and the yaw acceleration is an indication of the operating conditions (steady state vs. transients) of the vehicle.

The sub-system 12 includes an adaptive fuzzy membership function processor 60, the sub-system 16 includes an adaptive fuzzy membership function processor 62 and the sub-system 20 includes an adaptive fuzzy membership function processor 64. The processor 60 receives the residual $R_r$ from the residual generator 40 and the adaptive threshold signal from the threshold generator 50, and generates fuzzy membership functions, as will be discussed in detail below. Likewise, the processor 62 receives the residual $R_{a_y}$ from the residual generator 42 and the adaptive threshold signal from the threshold generator 52, and generates fuzzy membership functions. The processor 64 receives the residual $R_{\delta_f-\delta_r}$ from the residual generator 44 and the adaptive threshold signal from the threshold generator 54, and generates fuzzy logic membership functions.

The fuzzy logic membership functions are applied to a fuzzy decision logic processor 70 that provides a plurality of outputs indicating the condition of the various sensors being monitored. Block 68 receives several of the sensor signals, as shown, and provides model inputs to the processor 70 based on the sensor signals to be used in the membership function analysis. For example, output line 72 provides a signal as to whether the yaw rate sensor 14 has failed and, if so, the type of failure, output line 74 provides a signal as to whether the lateral acceleration sensor 18 has failed and, if so, the type of failure, output line 76 provides a signal as to whether the rear-right road wheel angle sensor has failed and, if so, the type of failure, output line 78 provides a signal as to whether the rear-left road wheel angle sensor has failed and, if so, the type of failure, output line 80 provides a signal as to whether the rear-right wheel speed sensor has failed and, if so, the type of failure, output line 82 provided signal as to whether the rear-left wheel speed sensor has failed and, if so, the type of failure, and output line 84 provides a signal as to whether the front road wheel angle sensor has failed and, if so, the type of failure.

Figure 2:
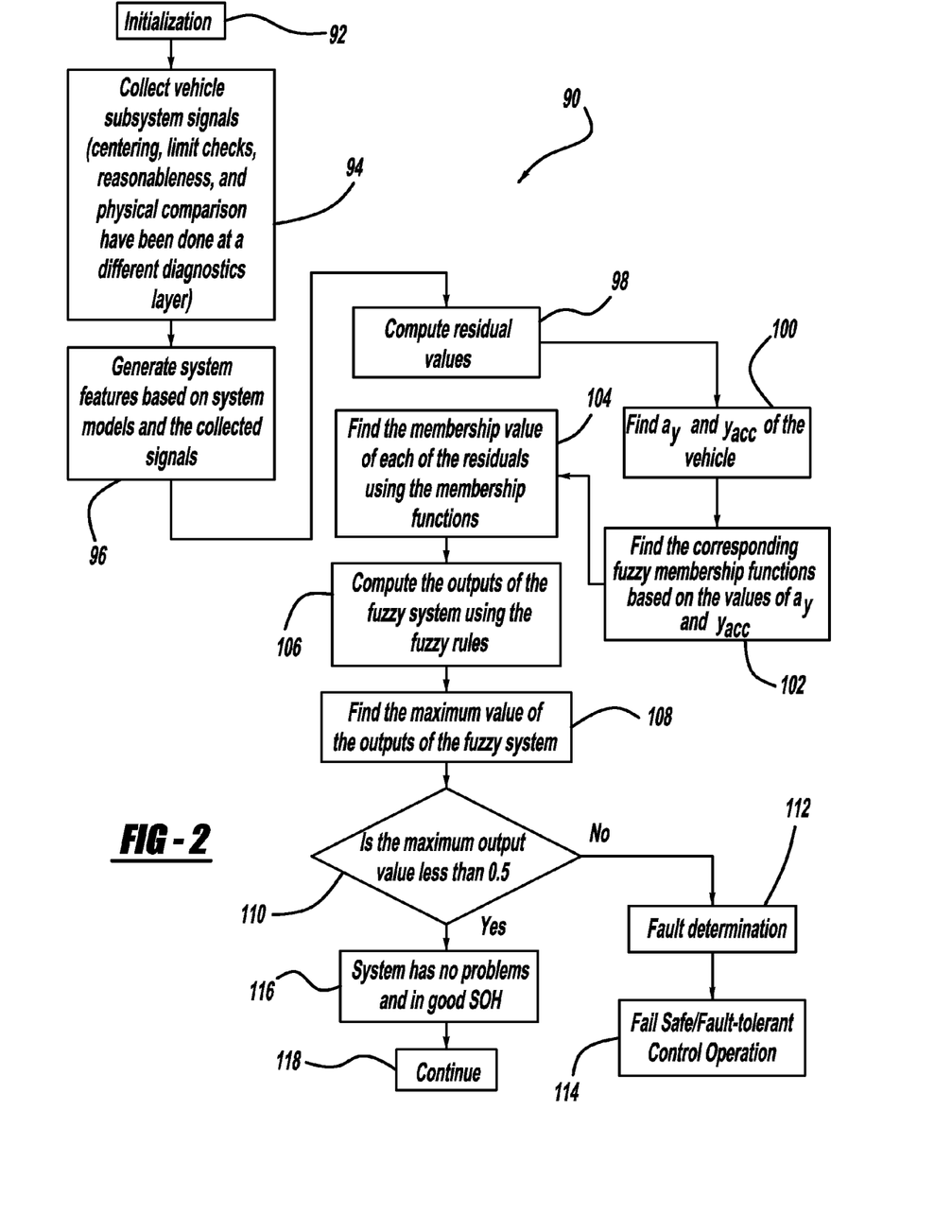
FIG. 2 is a flow chart diagram showing a process for monitoring the state of health of sensors, actuators and sub-systems used in an integrated vehicle stability control system, according to an embodiment of the present invention.

FIG. 2 is a flow chart diagram 90 showing a process for monitoring the state of health of sensors, actuators and sub-systems employed in an integrated vehicle stability control system, using adaptive fuzzy logic as discussed above for the system 10, according to an embodiment of the present invention. The system parameters are initialized at box 92. Each component and sub-system includes its own diagnostics provided by the component supplier that is checked by the algorithm of the invention in a supervisory manner. The supervisory diagnostics algorithm collects the diagnostics signals from the sub-systems and the components at box 94, and can receive controller area network (CAN), FlexRay, hard-wired communications signals, or any other suitable protocol from the components and the sub-systems. At this point of the process, various signal processing has already been performed, including, but not limited to, sensor calibration and centering, limit checks, reasonableness of output values and physical comparisons.

The algorithm then estimates the control system behavior using predetermined models at box 96, such as by the model processors 30, 32 and 34. In one non-limiting embodiment, the system behavior is estimated when the speed of the vehicle is greater than a predetermined minimum speed, such as 5 mph, to prevent division by a small number. In this non-limiting embodiment, three models are used to estimate the vehicle yaw rate r, the vehicle lateral acceleration $a_y$ and the difference between the front and rear road wheel angles $R_{\delta_f-\delta_r}$. In this non-limiting embodiment, the vehicle is a front-wheel drive vehicle and includes two rear-wheel steering actuators for independently steering the rear wheels. The rear wheel speeds are used to estimate the vehicle yaw rate.

Table 1 below shows example model equations for each of the yaw rate estimate, the lateral acceleration estimate and the road wheel angle (RWA) difference estimate. In theses equations, 2t is the width of the vehicle, l is the vehicle wheel-base and k is a coefficient. The actual measurements of the yaw rate r and the lateral acceleration $a_y$ are also used in the estimation models from the sensors. Other estimation methods can also be used that include parameter estimations and observers within the scope of the present invention.

In this embodiment, the vehicle is a by-wire vehicle in that electrical signals are used to provide traction drive signals and steering signals to the vehicles wheels. However, this is by way of a non-limiting example in that the system is applicable to be used in other types of vehicles that are not by-wire vehicles.

TABLE 1

| Model 1 (Yaw Rate Estimate $\hat{r}$) | $\hat{r} = \dfrac{v_{RR} - v_{RL}}{2t}$ |
|---|---|
| Model 2 (Lateral Acceleration Estimate $\hat{a}_y$) | $\hat{a}_y = rV_x$ |
| Model 3 (Road Wheel Angle Difference Estimate) | $\delta_f - \dfrac{\hat{\delta}_{rr} + \delta_{rl}}{2} = \dfrac{1}{V_x}r + ka_y$ |

The algorithm then determines residual values or errors (difference) between the estimates from the models and the measured values at box 98, such as by the residual generators 40, 42 and 44. One example of the residual calculations is shown in Table 2, where four residuals are generated. The first three residuals for the lateral acceleration, the yaw rate and the RWA difference ($R_{a_y}$, $R_r$ and $R_{\delta_r-\delta_r}$) are based on the estimation model equations in Table 1. The fourth residual R provides a combined error signal for all of the wheel speeds, as would be particularly applicable in a by-wire vehicle system.

mentioned above, the lateral acceleration $a_y$ of the vehicle is an indication of the operating region (non-linearity level) of the vehicle, while the yaw acceleration is an indication of the operating conditions (steady state vs. transients) of the vehicle. One procedure to develop the fuzzy membership functions that adapt to the vehicle indicators will be described below.

Figure 3:
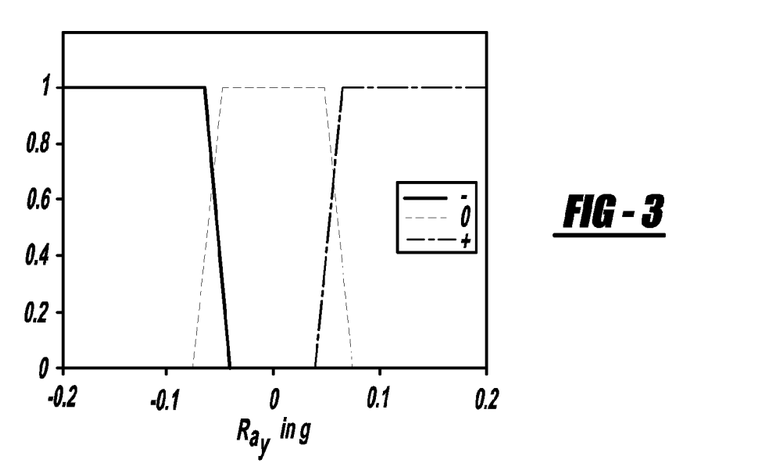
FIGS. 3-6 are graphs showing fuzzy logic membership functions.
Figure 4:
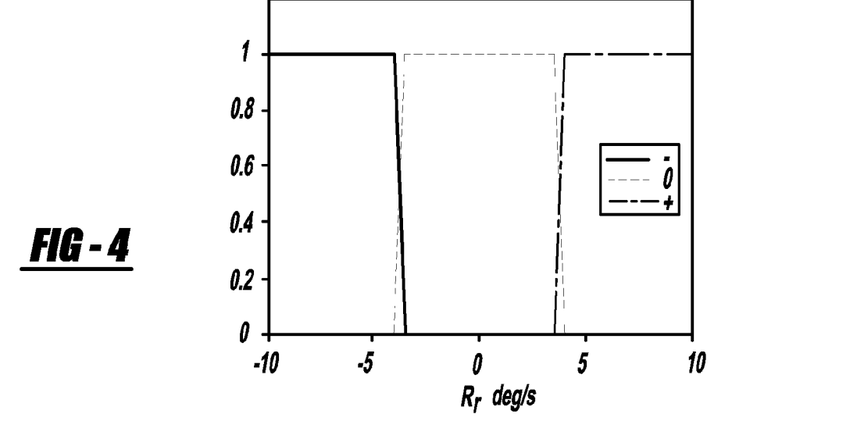
Figure 5:
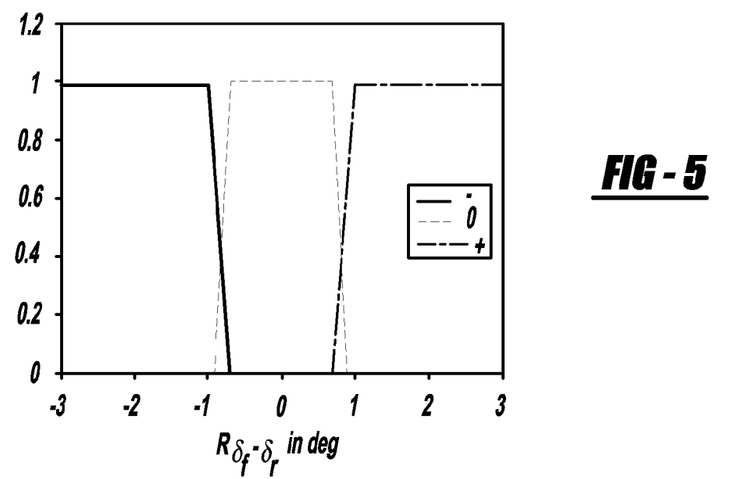
Figure 6:
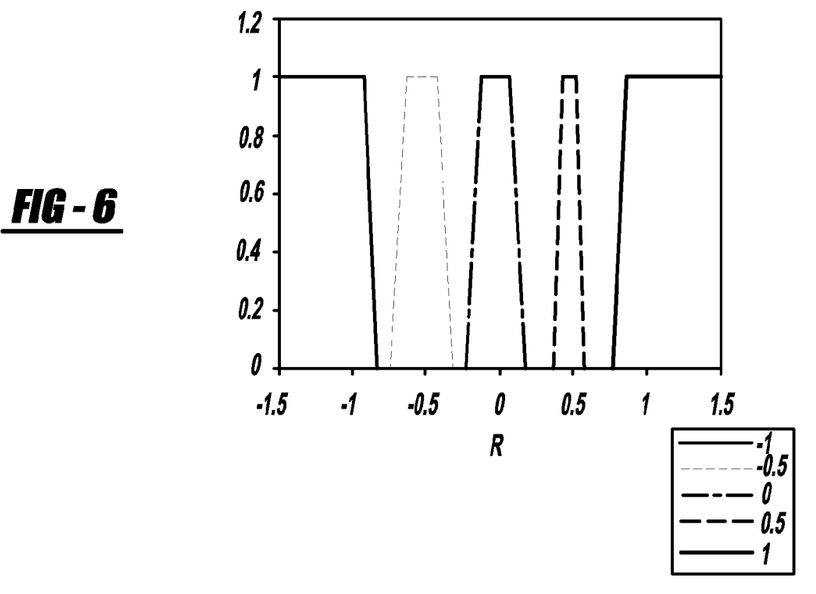

According to fuzzy logic systems, membership functions define a degree of membership for residual variables. For example, representative membership functions 0, + and − for each of the residuals $R_{a_y}$, $R_r$, $R_{\delta_r-\delta_r}$ and membership functions −1, −0.5, 0, 1 for the residual R are shown in the graphs of FIGS. 3-6. Particularly, FIG. 3 shows exemplary membership functions +, −, 0 for the lateral acceleration residual $R_{a_y}$, FIG. 4 shows exemplary membership functions −, 0, + for the yaw rate residual $R_r$, FIG. 5 shows exemplary membership functions −, 0, + for the RWA difference residual $R_{\delta_r-\delta_r}$ and FIG. 6 shows exemplary membership functions −1, −0.5, 0, 1 for the combined residual R.

The algorithm determines the degree of membership value for each of the membership functions for each residual at box 104, such as by the processor 70. Particularly, a residual degree of membership value on the vertical axis of the graphs in FIGS. 3-6 is provided for each membership function. The shape of the membership functions shown in FIGS. 3-6 is application specific in that the membership functions can have any suitable shape depending on the sensitivity of the fault isolation detection desired for a particular vehicle.

Table 3 below identifies fourteen faults for the lateral acceleration sensor, the yaw rate sensor, the road wheel angle sensors and the wheel speed sensors at the outputs of the processor 70. This is by way of a non-limiting example in that

TABLE 2

| $R_{a_y}$ (Lateral Acceleration) | $a_y - \hat{a}_y$ |
|---|---|
| $R_r$ (yaw rate) | $r - \hat{r}$ |
| $R_{\delta_r-\delta_r}$ (Road wheel angles) | $\left(\delta_f - \left(\dfrac{\delta_{rr} + \delta_{rl}}{2}\right)\right) - \left(\delta_f - \dfrac{(\hat{\delta}_{rr} + \delta_{rl})}{2}\right)$ |
| R | $-\left[\left\|v_{RR} - \dfrac{v_{FR} + v_{FL}}{2}\right\| > \text{Th1}\right] - 0.5\left[\left\|v_{RL} - \dfrac{v_{FR} + v_{FL}}{2}\right\| > \text{Th1}\right]$ |
| | $-\left[\left\|\delta_{rr} - \left(\delta_f - \dfrac{1}{V_x}r - ka_y\right)\right\| > \text{Th2}\right] \cdot [|\delta_{rr} - \delta_{rl}| > \text{Th3}]$ |
| | $-0.5\left[\left\|\delta_{rl} - \left(\delta_f - \dfrac{1}{V_x}r - ka_y\right)\right\| > \text{Th2}\right] \cdot [|\delta_{rr} - \delta_{rl}| > \text{Th3}]$ |
| | $+ 0.5\left[|R_{a_y}| > \text{Th4}\right] \cdot [|R_r| \leq \text{Th5}]$ |
| | $+ [|R_r| > \text{Th5}] \cdot \text{NOR}\left(\left[\left\|v_{RR} - \dfrac{v_{FR} + v_{FL}}{2}\right\| > \text{Th1}\right], \left[\left\|v_{RL} - \dfrac{v_{FR} + v_{FL}}{2}\right\| > \left|\text{Th1}\right|\right]\right)$ |

Note:
[a>b] has a value 1 if a>b and 0 otherwise.

The algorithm then reads the lateral acceleration $a_y$ and the yaw acceleration $y_{acc}$ (dr/dt) of the vehicle at box 100, and finds the corresponding fuzzy membership functions based on the lateral acceleration $a_y$ and the yaw acceleration $y_{acc}$ at box 102 such as by the adaptive fuzzy logic membership functions processors 60, 62 and 64. The membership functions are adapted based on the operation region and conditions of the vehicle as discussed above for the system 10. As other systems may identify other faults for other components or a different number of faults. In each column, a particular membership function is defined for each of the residuals $R_{a_y}$, $R_r$, $R_{\delta_r-\delta_r}$ and R for each fault. A residual has a degree of membership and only one membership function. Therefore, one degree of membership value is defined for each residual from the membership function. The value "d" is a "don't care" value, i.e., the residual does not matter.

TABLE 3

| Faults | Residuals | | | |
|---|---|---|---|---|
| | $R_{a_y}$ | $R_r$ | $R_{\delta_f-\delta_r}$ | R |
| $a_y + \Delta a_y$ | + | 0 | d | 0.5 |
| $a_y - \Delta a_y$ | − | 0 | d | 0.5 |
| $r + \Delta r$ | d | + | d | 1 |
| $r - \Delta r$ | d | − | d | 1 |
| $\delta_f + \Delta \delta_f$ | 0 | 0 | + | 0 |
| $\delta_f - \Delta \delta_f$ | 0 | 0 | − | 0 |
| $\delta_{rr} + \Delta \delta_{rr}$ | 0 | 0 | − | −1 |
| $\delta_{rr} - \Delta \delta_{rr}$ | 0 | 0 | + | −1 |
| $\delta_{rl} + \Delta \delta_{rl}$ | 0 | 0 | − | −0.5 |
| $\delta_{rl} - \Delta \delta_{rl}$ | 0 | 0 | + | −0.5 |
| $V_{RR} + \Delta V_{RR}$ | 0 | − | 0 | −1 |
| $V_{RR} - \Delta V_{RR}$ | 0 | + | 0 | −1 |
| $V_{RL} + \Delta V_{RL}$ | 0 | + | 0 | −0.5 |
| $V_{RL} - \Delta V_{RL}$ | 0 | − | 0 | −0.5 |

The algorithm computes the outputs of the fuzzy logic processor 70 using fuzzy rules at box 106. Fuzzy rules define the fuzzy implementation of the fault symptoms relationships. Table 4 below gives a non-limiting representative example of the fuzzy rules for this non-limiting embodiment. Each fault shown in Table 3 produces a unique pattern of residuals, where it can be seen that the source, location and type of fault can be determined. The fuzzy logical rules shown in Table 4 correspond to the patterns in Table 3. The output of each rule defines a crisp number, such as according to the general Sugeno fuzzy system, that can be interpreted as the probability of the occurrence of that specific fault. The fuzzy reasoning system being described herein can be interpreted as the fuzzy implementation of threshold values. The system increases the robustness of the diagnostics for both signal errors and model inaccuracies, and thus, reduces false alarms. The system will also increase the sensitivity to faults that can endanger vehicle stability and safety performance.

TABLE 4

If ($R_{a_y}$ = "+") and ($R_r$ = "0") and ($R_{\delta_f-\delta_r}$ = "d") and (R = "1") then (($a_y - \Delta a_y$) = 1)
If ($R_{a_y}$ = "−") and ($R_r$ = "0") and ($R_{\delta_f-\delta_r}$ = "d") and (R = "1") then (($a_y - \Delta a_y$) = 1)
If ($R_{a_y}$ = "−") and ($R_r$ = "+") and ($R_{\delta_f-\delta_r}$ = "d") and (R = "1") then (($r + \Delta r$) = 1)
If ($R_{a_y}$ = "+") and ($R_r$ = "−") and ($R_{\delta_f-\delta_r}$ = "d") and (R = "1") then (($r - \Delta r$) = 1)
If ($R_{a_y}$ = "0") and ($R_r$ = "0") and ($R_{\delta_f-\delta_r}$ = "+") and (R = "0") then ($\delta_f + \Delta \delta_f$ = 1)
If ($R_{a_y}$ = "0") and ($R_r$ = "0") and ($R_{\delta_f-\delta_r}$ = "−") and (R = "0") then ($\delta_f - \Delta \delta_f$ = 1)
If ($R_{a_y}$ = "0") and ($R_r$ = "0") and ($R_{\delta_f-\delta_r}$ = "−") and (R = "−1") then ($\delta_{rr} + \Delta \delta_{rr}$ = 1)
If ($R_{a_y}$ = "0") and ($R_r$ = "0") and ($R_{\delta_f-\delta_r}$ = "+") and (R = "−1") then ($\delta_{rr} - \Delta \delta_{rr}$ = 1)
If ($R_{a_y}$ = "0") and ($R_r$ = "0") and ($R_{\delta_f-\delta_r}$ = "−") and (R = "−0.5") then ($\delta_{rl} + \Delta \delta_{rl}$ = 1)
If ($R_{a_y}$ = "0") and ($R_r$ = "0") and ($R_{\delta_f-\delta_r}$ = "+") and (R = "−0.5") then ($\delta_{rl} - \Delta \delta_{rl}$ = 1)
If ($R_{a_y}$ = "0") and ($R_r$ = "−") and ($R_{\delta_f-\delta_r}$ = "0") and (R = "−1") then ($V_{RR} + \Delta V_{RR}$ = 1)
If ($R_{a_y}$ = "0") and ($R_r$ = "+") and ($R_{\delta_f-\delta_r}$ = "0") and (R = "−1") then ($V_{RR} - \Delta V_{RR}$ = 1)
If ($R_{a_y}$ = "0") and ($R_r$ = "+") and ($R_{\delta_f-\delta_r}$ = "0") and (R = "−0.5") then ($V_{RL} + \Delta V_{RL}$ = 1)
If ($R_{a_y}$ = "0") and ($R_r$ = "−") and ($R_{\delta_f-\delta_r}$ = "0") and (R = "−0.5") then ($V_{RL} - \Delta V_{RL}$ = 1)

A degree of membership value is assigned to each residual, as discussed above, and the lowest degree of membership value of the four possible degrees of membership values is assigned the degree of membership value for the possible resulting fault based on the rules in Table 4. Once each possible row (fault) has been assigned its degree of membership value for that fault, the algorithm chooses the largest of the fourteen minimum degree of membership values as the output of the fuzzy system at box 108. The system only identifies one fault at a time.

The algorithm then determines if the maximum degree of membership value is less than 0.5 at decision diamond 110. It is noted that the value 0.5 is an arbitrary example in that any percentage value can be selected for this value depending on the specific system response and fault detection. If the maximum degree of membership value is greater than 0.5, then the algorithm determines the corresponding fault at box 112, and then, based on the fault source, goes into a fail-safe/or fail-tolerant operation strategy at box 114. If the maximum degree of membership value is less than 0.5 at the decision diamond 108, then the algorithm determines that the system has no problems and has a good state of health (SOH) at box 116, and continues with monitoring the state of health at box 118.

Most of the tuning rules for the membership functions select the "0's" membership functions so that the values of the residuals are within the range of the membership functions for any possible vehicle maneuver when no sensor faults are present. One non-limiting procedure to design and determine the adaptive membership functions can be described as follows. First, vehicle tests are conducted without any sensor faults. The test runs should consist of lane changes, double lane changes, slalom and step steer maneuvers at all vehicle longitudinal speeds varying from 30 km/h to 110 km/h on dry, wet and icy road surfaces, as well as smooth and bumpy roads. The tests should include test runs that have the vehicle acceleration and deceleration at different levels and different road surfaces, as well as roads with varied inclines and banks.

Figure 7:
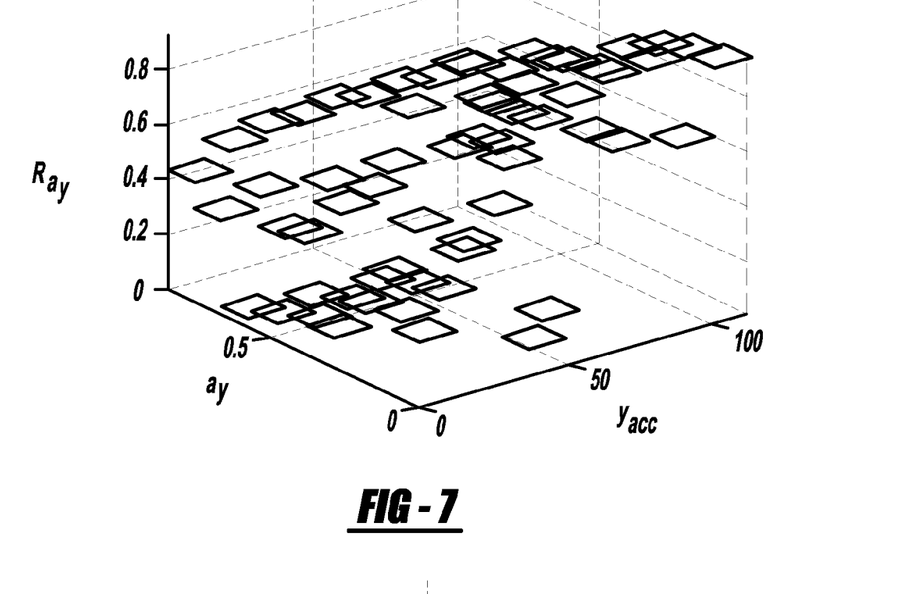
FIGS. 7-10 are graphs showing maximum residual values as a function of lateral acceleration and yaw acceleration.
Figure 8:
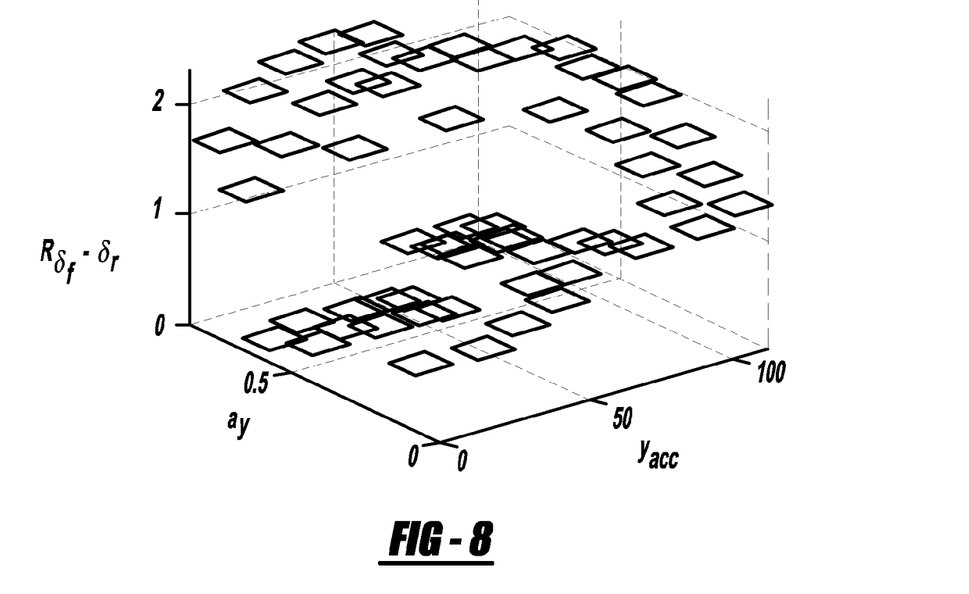
Figure 9:
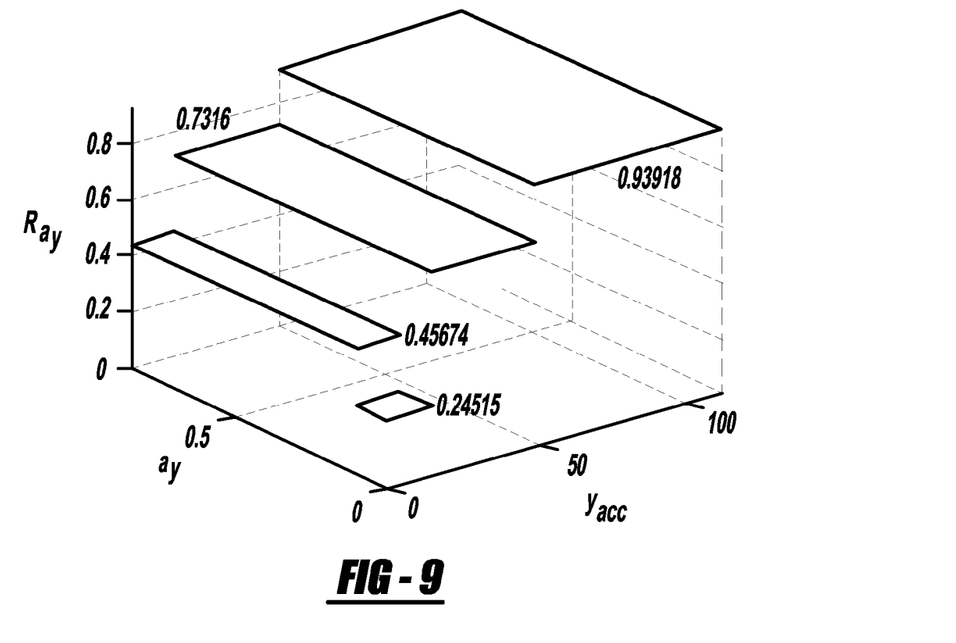
Figure 10:
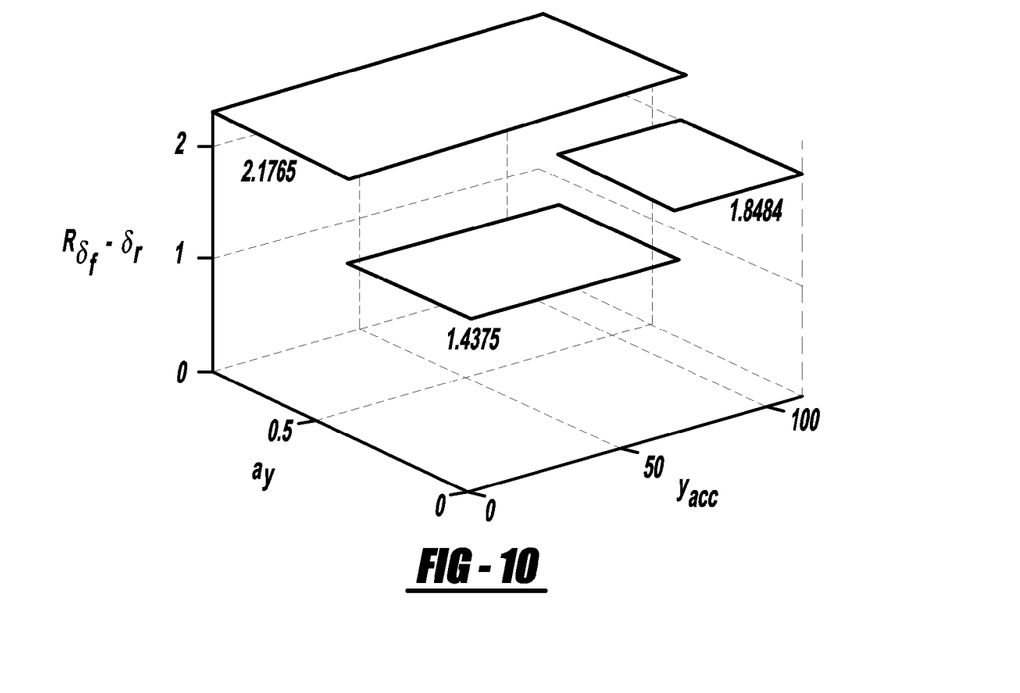
Figure 11:
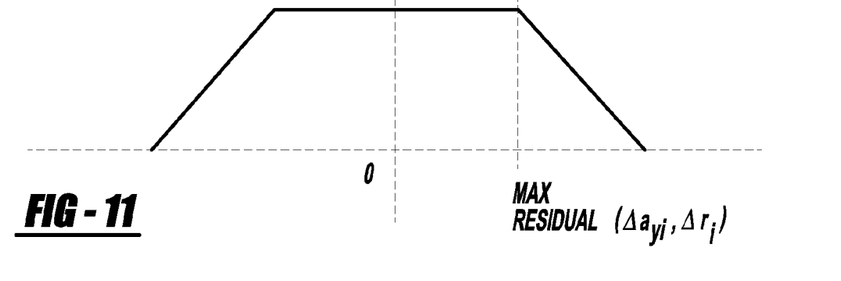
FIG. 11 is a graph showing a "0" membership function.

Then, record the values of the residuals together with the lateral acceleration $a_y$ and the low-pass filtered version of the timed derivative of the vehicle yaw rate (dr/dt). It should be noted that the residual is not affected very much by the vehicle maneuvers, so a constant set of membership functions can be associated with it. Next, form a uniform grid in the lateral acceleration and yaw acceleration plane ($a_y$, $\hat{r}$) and check the data previously collected against the grid. When the lateral acceleration and the time derivative of the vehicle yaw rate for each time instant falls into a certain category, such as ($a_y$, $\hat{r}$) ∈ ($\Delta a_{y_i}$, $\Delta \hat{r}_j$), compare the corresponding residual value with the other residual values to data that also falls in the same block where only the maximum residual is kept. An illustration of the residual values for various grids are shown in FIGS. 7 and 8 where planes with heights corresponding to the maximum residual values are drawn for easy visualization of the data. In order to simplify the implementation of the adaptive membership function scheme, a smaller grid can be chosen by visual analysis of the previous plots, and similarly the maximum residual value over all other runs is detected for each clock, as shown in FIGS. 9 and 10. Next, design a set of membership functions for each block with the "0" membership functions chosen according to the graph shown in FIG. 11.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for detecting faults in a vehicle control system, said method comprising:
    identifying a plurality of potential faults;
    identifying a plurality of measured values in the control system;
    identifying a plurality of estimated values based on models in the control system;
    identifying a plurality of residual error values as the difference between the estimated values and the measured values;
    identifying a plurality of vehicle operation regions and/or vehicle operating conditions;
    defining a plurality of membership functions for each residual error value where the membership functions are adapted based on a current vehicle operating region and/or vehicle operating conditions from the plurality of vehicle operation regions and/or vehicle operating conditions;
    determining a degree of membership value for each residual error value based on the membership functions; and
    determining whether a fault exists by analyzing the degree of membership values.

2. The method according to claim 1 wherein the current vehicle operating region is determined by a lateral acceleration of the vehicle and the current vehicle operating conditions are determined by a yaw acceleration of the vehicle.

3. The method according to claim 2 wherein defining a plurality of membership functions includes performing various vehicle tests without any faults where the tests include different vehicle maneuvers at different speeds on different road surfaces with different conditions, recording values of the residual error values with the lateral acceleration and yaw acceleration of the vehicle, determining whether the lateral acceleration and the yaw acceleration for each instant in time falls into a predetermined block, and comparing the corresponding residual value with the other residual values to data that also falls in the same block.

4. The method according to claim 1 wherein identifying a plurality of potential faults includes identifying faults related to a lateral acceleration sensor, a yaw rate sensor, road wheel angle sensors and wheel speed sensors.

5. The method according to claim 1 wherein identifying a plurality of measured values includes identifying a vehicle yaw rate, a vehicle lateral acceleration and a road wheel angle difference between a front wheel of the vehicle and a rear wheel of the vehicle.

6. The method according to claim 1 wherein identifying a plurality of residual error values includes defining four residual error values as a difference between a measured vehicle lateral acceleration signal and an estimated lateral acceleration signal, a measured yaw rate signal and an estimated yaw rate signal, a measured road wheel angle difference and an estimated road wheel angle difference and a combined signal for all of the vehicle wheel speeds and other values.

7. The method according to claim 1 wherein defining a plurality of membership functions includes defining at least three membership functions for each residual error value.

8. The method according to claim 1 wherein determining a degree of membership value for each residual error value includes assigning one of the degree of membership values to each residual for each potential fault.

9. The method according to claim 1 wherein determining whether a fault exists includes determining whether a particular set of degree of membership values exceeds a predetermined threshold in a certain pattern.

10. The method according to claim 1 further comprising putting the vehicle in a fail-safe mode of operation if a fault is detected.

11. A method for detecting a fault in a vehicle control system, said method comprising:
    identifying a plurality of potential faults;
    identifying a plurality of measured values in the control system;
    identifying a plurality of estimated values based on models in the control system;
    identifying a plurality of residual error values as the difference between the estimated values and the measured values;
    identifying a plurality of vehicle operation regions and/or vehicle operating conditions;
    defining at least three membership functions for each residual error value where the membership functions are changed in response to changes of a current vehicle operating region and/or vehicle operating conditions from the plurality of vehicle operation regions and/or vehicle operating conditions;
    determining a degree of membership value for each residual error value including assigning one of the degree of membership values to each residual for each potential fault; and
    determining whether a fault exists by analyzing the degree of membership values, wherein determining whether a fault exists includes determining whether a particular set of degree of membership values exceeds a predetermined threshold in a certain pattern.

12. The method according to claim 11 wherein the current vehicle operating region is determined by a lateral acceleration of the vehicle and the current vehicle operating conditions are determined by a yaw acceleration of the vehicle.

13. The method according to claim 12 wherein defining a plurality of membership functions includes performing various vehicle tests without any faults where the tests include different vehicle maneuvers at different speeds on different road surfaces with different conditions, recording values of the residual error values with the lateral acceleration and yaw acceleration of the vehicle, determining whether the lateral acceleration and the yaw acceleration for each instant in time falls into a predetermined block, and comparing the corresponding residual value with the other residual values to data that also falls in the same block.

14. The method according to claim 11 wherein identifying a plurality of potential faults includes identifying faults related to a lateral acceleration sensor, a yaw rate sensor, road wheel angle sensors and wheel speed sensors.

15. The method according to claim 14 wherein identifying a plurality of measured values includes identifying a vehicle yaw rate, a vehicle lateral acceleration and a road wheel angle difference between a front wheel of the vehicle and a rear wheel of the vehicle.

16. The method according to claim 15 wherein identifying a plurality of residual error values includes defining four residual error values as a difference between a measured vehicle lateral acceleration signal and an estimated lateral acceleration signal, a measured yaw rate signal and an estimated yaw rate signal, a measured road wheel angle difference and an estimated road wheel angle difference and a combined signal for all of the vehicle wheel speeds and other values.

17. A system for detecting a fault in a vehicle control system, said system comprising:
- means for identifying a plurality of potential faults;
- means for identifying a plurality of measured values in the control system;
- means for identifying a plurality of estimated values based on models in the control system;
- means for identifying a plurality of residual error values as the difference between the estimated values and the measured values;
- means for identifying a plurality of vehicle operation regions and/or vehicle operating conditions;
- means for defining a plurality of degree of membership functions for each residual error value where the membership functions are adapted based on current vehicle operating region and/or vehicle operating conditions from the plurality of vehicle operating regions and/or vehicle operating conditions;
- means for determining a degree of membership value for each residual error value based on the membership functions; and
- means for determining whether a fault exists by analyzing the degree of membership values.

18. The system according to claim 17 wherein the current vehicle operating region is determined by a lateral acceleration of the vehicle and the current vehicle operating conditions are determined by a yaw acceleration of the vehicle.

19. The system according to claim 18 wherein the means for defining a plurality of membership functions includes means for performing various vehicle tests without any faults where the tests include different vehicle maneuvers at different speeds on different road surfaces with different conditions, means for recording values of the residual error values with the lateral acceleration and yaw acceleration of the vehicle, means for determining whether the lateral acceleration and the yaw acceleration for each instant in time falls into a predetermined block, and means for comparing the corresponding residual value with the other residual values to data that also falls in the same block.

20. The system according to claim 17 wherein the means for identifying a plurality of potential faults includes means for identifying faults related to a lateral acceleration sensor, a yaw rate sensor, road wheel angle sensors and wheel speed sensors.

21. The system according to claim 17 wherein the means for identifying a plurality of measured values includes means for identifying a vehicle yaw rate, a vehicle lateral acceleration and a road wheel angle difference between a front wheel of the vehicle and a rear wheel of the vehicle.

22. The system according to claim 17 wherein the means for identifying a plurality of residual error values includes means for defining four residual error values as a difference between a measured vehicle lateral acceleration signal and an estimated lateral acceleration signal, a measured yaw rate signal and an estimated yaw rate signal, a measured road wheel angle difference and an estimated road wheel angle difference and a combined signal for all of the vehicle wheel speeds and other values.

23. The system according to claim 17 wherein the means for determining a membership value for each residual error value includes means for assigning one of the degree of membership values to each residual for each potential fault.

24. The system according to claim 17 wherein the means for determining whether a fault exists includes means for determining whether a particular set of degree of membership values exceeds a predetermined threshold in a certain pattern.

25. The system according to claim 17 further comprising means for putting the vehicle in a fail-safe mode of operation if a fault is detected.

* * * * *